United States Patent
Yuan et al.

(10) Patent No.: US 11,443,255 B2
(45) Date of Patent: Sep. 13, 2022

(54) ACTIVITY-BASED INFERENCE OF TITLE PREFERENCES

(71) Applicant: Microsoft Technology Licensing, LLC, Redmond, WA (US)

(72) Inventors: Ye Yuan, Mountain View, CA (US); Girish Kathalagiri Somashekariah, Santa Clara, CA (US); Huichao Xue, Santa Clara, CA (US); Ada Cheuk Ying Yu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 959 days.

(21) Appl. No.: 16/185,365

(22) Filed: Nov. 9, 2018

(65) Prior Publication Data

US 2020/0151586 A1 May 14, 2020

(51) Int. Cl.
*G06Q 10/06* (2012.01)
*G06Q 10/10* (2012.01)
*G06N 5/04* (2006.01)
*G06N 20/00* (2019.01)

(52) U.S. Cl.
CPC ....... *G06Q 10/063112* (2013.01); *G06N 5/04* (2013.01); *G06N 20/00* (2019.01); *G06Q 10/1053* (2013.01)

(58) Field of Classification Search
None
See application file for complete search history.

(56) References Cited

U.S. PATENT DOCUMENTS

| | | | | |
|---|---|---|---|---|
| 2017/0228696 A1* | 8/2017 | Brdiczka | ........... | G06Q 10/1053 |
| 2017/0286865 A1* | 10/2017 | Fang | .................... | G06Q 10/105 |
| 2018/0173803 A1* | 6/2018 | Grover | ............... | G06F 16/9535 |
| 2018/0336241 A1* | 11/2018 | Noh | ....... | G06F 16/958 |
| 2019/0095788 A1* | 3/2019 | Yazdani | ................... | G06N 3/08 |
| 2019/0205838 A1* | 7/2019 | Fang | ...................... | G06N 20/00 |

OTHER PUBLICATIONS

S. Benabderrahmane, N. Mellouli, M. Lamolle and N. Mimouni, "When Deep Neural Networks Meet Job Offers Recommendation," 2017 IEEE 29th International Conference on Tools with Artificial Intelligence (ICTAI), 2017, pp. 223-230, doi: 10.1109/ICTAI .2017. 00044. (Year: 2017).*

(Continued)

*Primary Examiner* — Mehmet Yesildag
(74) *Attorney, Agent, or Firm* — Schwegman Lundberg & Woessner, P.A.

(57) ABSTRACT

The disclosed embodiments provide a system for performing activity-based inference of title preferences. During operation, the system determines features and labels related to first title preferences for jobs sought by a first set of candidates. Next, the system inputs the features and the labels as training data for a machine learning model. The system then applies the machine learning model to additional features for a second set of candidates to produce predictions of second title preferences for the second set of candidates. Finally, the system stores the predictions in association with the second set of candidates.

11 Claims, 5 Drawing Sheets

(56) References Cited

OTHER PUBLICATIONS

S. Ahmed, M. Hasan, M. N. Hoq and M. A. Adnan, "User interaction analysis to recommend suitable jobs in career-oriented social networking sites," 2016 International Conference on Data and Software Engineering (ICoDSE), 2016, pp. 1-6, doi: 10.1109/ICODSE .2016.7936143. (Year: 2016).*

M. Agrawal, T. Gonçlves and P. Quaresma, "A hybrid approach for cold start recommendations," 2017 11th International Conference on Software, Knowledge, Information Management and Applications (SKIMA), 2017, pp. 1-6, doi: 10.1109/SKIMA .2017. 8294101. (Year: 2017).*

* cited by examiner

ACTIVITY-BASED INFERENCE OF TITLE PREFERENCES

RELATED APPLICATIONS

The subject matter of this application is related to the subject matter in a co-pending non-provisional application and filed on the same day as the instant application, entitled "Ranking Job Recommendations Based on Title Preferences," having Ser. No. 16/185,262, and filing date Nov. 9, 2018.

The subject matter of this application is related to the subject matter in a co-pending non-provisional application and filed on the same day as the instant application, entitled "Recommending Jobs Based on Title Transition Embeddings," having Ser. No. 16/185,272, and filing date Nov. 9, 2018.

BACKGROUND

Field

The disclosed embodiments relate to inference of user attributes. More specifically, the disclosed embodiments relate to techniques for performing activity-based inference of title preferences.

Related Art

Online networks may include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for performing activity-based inference of title preferences. The title preferences may include titles that represent the preferred "next step" in the candidates' career paths. In these embodiments, the title preferences are inferred from job-related activity of the candidates instead of being explicitly provided by the candidates.

In particular, a machine learning model is trained to predict the likelihood that a potential title preference is an actual title preference of a candidate based on features that include titles in recent job applications, job search queries, job views, and/or other types of job-related activity by the candidate. The machine learning model may be trained using positive labels that are based on recently specified title preferences associated with a set of candidates and/or negative labels that are based on randomly selected title preferences that are not the recently specified title preferences of the candidates.

The machine learning model may then be used to infer title preferences for another set of candidates that lack explicit title preferences. In turn, the inferred title preferences may be recommended as actual title preferences to the candidates and/or included in features that are used to generate job recommendations for the candidates.

By inferring title preferences from titles of recent job-related interactions by candidates, the disclosed embodiments may predict the intentions and/or goals of the candidates with respect to the candidates' careers and/or job searches. In turn, the disclosed embodiments may improve the accuracy and/or relevance of subsequent recommendations and/or insights related to the candidates' job-seeking behavior. In contrast, conventional techniques may require explicit title preferences from the candidates and/or apply hard filters that generate job recommendations based on exact matches with the title preferences, thereby limiting the recommendations to candidates that manually set title preferences and/or a small or narrow set of jobs. Consequently, the disclosed embodiments may improve computer systems, applications, user experiences, tools, and/or technologies related to user recommendations, employment, recruiting, and/or hiring.

Activity-Based Inference of Title Preferences

Figure 1:
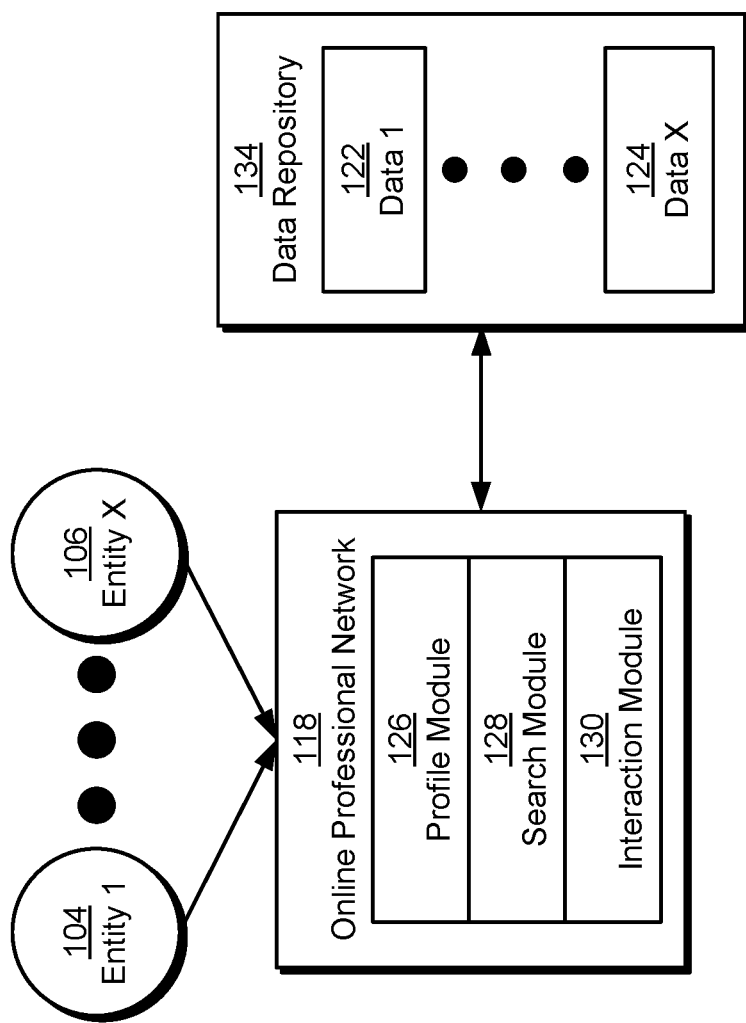
FIG. 1 shows a schematic of a system in accordance with the disclosed embodiments.

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates for jobs or opportunities listed within or outside online network 118. The candidates may include users who have viewed, searched for, or applied to jobs, positions, roles, and/or opportunities, within or outside online network 118. The candidates may also, or instead, include users and/or members of online network 118 with skills, work experience, and/or other attributes or qualifications that match the corresponding jobs, positions, roles, and/or opportunities.

After the candidates are identified, profile and/or activity data of the candidates may be inputted into the machine learning model(s), along with features and/or characteristics of the corresponding opportunities (e.g., required or desired skills, education, experience, industry, title, etc.). The machine learning model(s) may output scores representing the strength of the candidates with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, etc.).

In turn, rankings based on the scores and/or associated insights may improve the quality of the candidates and/or recommendations of opportunities to the candidates, increase user activity with online network 118, and/or guide the decisions of the candidates and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

Figure 2:
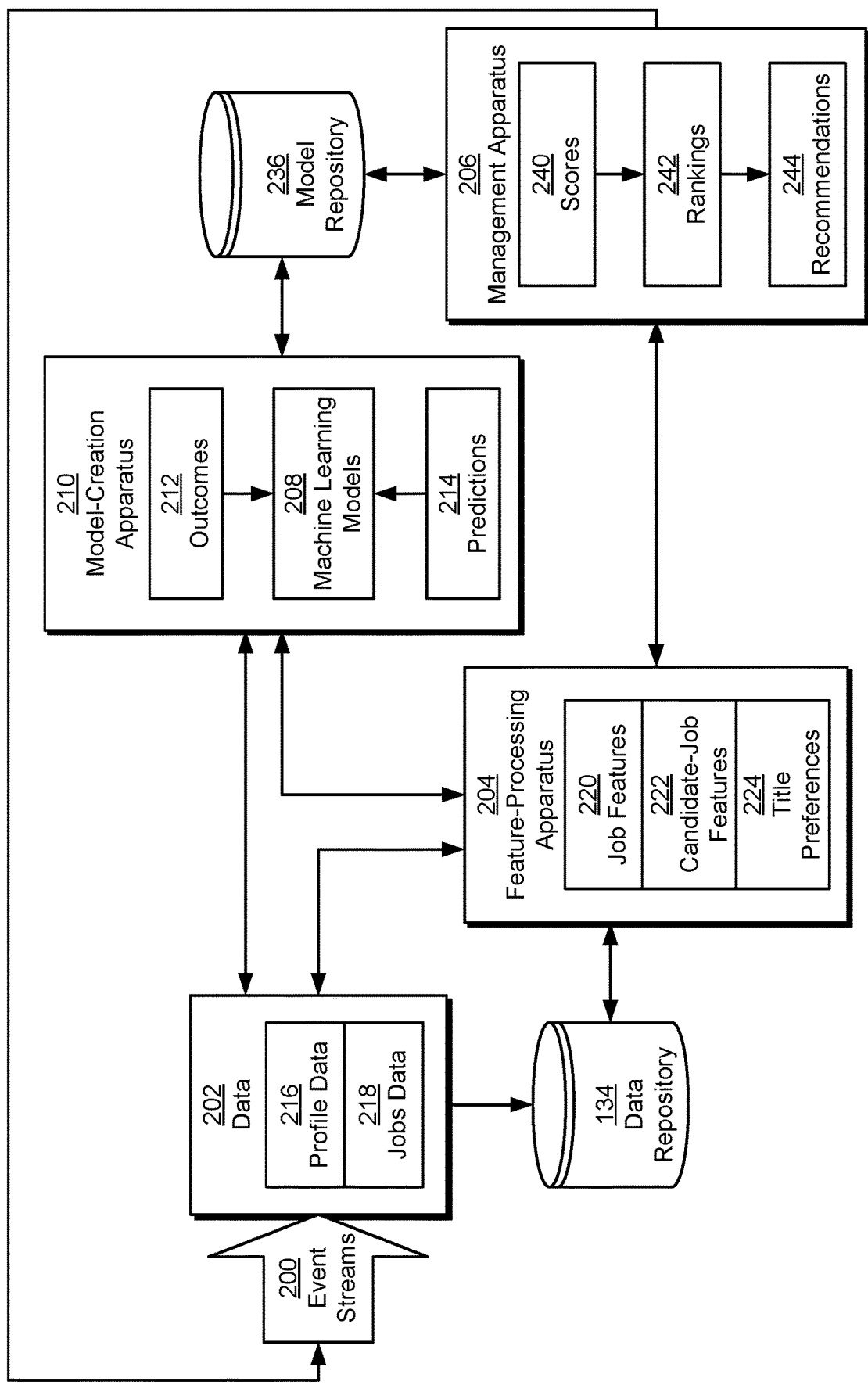
FIG. 2 shows a system for processing data in accordance with the disclosed embodiments.

In one or more embodiments, online network 118 includes functionality to improve the timeliness, relevance, and/or accuracy of job recommendations outputted to the candidates. As shown in FIG. 2, data repository 134 and/or another primary data store may be queried for data 202 that includes profile data 216 for members of an online network (e.g., online network 118 of FIG. 1), as well as jobs data 218 for jobs that are listed or described within or outside the online network. Profile data 216 includes data associated with member profiles in the online network. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, and/or other data related to the user's interaction with the online network.

Attributes of the members from profile data 216 may be matched to a number of member segments, with each member segment containing a group of members that share one or more common attributes. For example, member segments in the online network may be defined to include members with the same industry, title, location, and/or language.

Connection information in profile data 216 may additionally be combined into a graph, with nodes in the graph representing entities (e.g., users, schools, companies, locations, etc.) in the online network. In turn, edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 may include structured and/or unstructured data for job listings and/or job descriptions that are posted and/or provided by members of the online network. For example, jobs data 218 for a given job or job listing may include a declared or inferred title, company, required or desired skills, responsibilities, qualifications, role, location, industry, seniority, salary range, benefits, and/or member segment.

Profile data 216 and/or jobs data 218 may further include job histories of members of the online network. Each job history may include a chronological sequence of jobs for a given member that terminates in the member's current job and/or the member's most recently listed job. As a result, the job history may be assembled from current and/or previous jobs listed in the member's current profile data 216. The job history may also, or instead, be supplemented with job listings, job descriptions, and/or other information in jobs data 218. For example, a job listing that is posted in the online network may be matched to a member that applies for and subsequently accepts an offer for the corresponding job. In turn, the job in the member's job history may be populated and/or associated with skills, benefits, qualifications, requirements, salary information, and/or other information from the job listing.

In one or more embodiments, data repository 134 stores data that represents standardized, organized, and/or classified attributes in profile data 216 and/or jobs data 218. For example, skills in profile data 216 and/or jobs data 218 may be organized into a hierarchical taxonomy that is stored in data repository 134. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, jobs data 218, and/or other data 202 that is represented by the time periods (e.g., starting a job in a given month or year, graduating from university within a five-year span, job listings posted within a two-week period, etc.).

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

A feature-processing apparatus 204 uses data 202 from event streams 200 and/or data repository 134 to calculate a set of features for a candidate and/or one or more jobs. For example, feature-processing apparatus 204 may execute on an offline, periodic, and/or batch-processing basis to produce features for a large number of candidates and/or candidate-job pairs (e.g., combinations of members in the community and jobs for which the members are qualified). In another example, feature-processing apparatus 204 may generate features in an online, nearline, and/or on-demand basis based on recent job-seeking activity by a candidate (e.g., a user session with the community, a job search, a job view, a click on a job, an application for a job, etc.).

More specifically, feature-processing apparatus 204 may generate job features 220 for jobs, candidate-job features 222 for candidate-job pairs, and/or title preferences 224 for candidates. Job features 220 may include attributes related to a listing of an opportunity. For example, job features 220 may include declared or inferred attributes of a job (e.g., from jobs data 218), such as the job's title, company (i.e., employer), industry, seniority, desired skill and experience, salary range, and/or location.

One or more job features 220 may also be derived features that are generated from other types of features. For example, job features 220 may provide a context of each candidate's impression of a job listing or job description. The context may include a time and location at which the job listing or description is viewed by the candidate. The location can encompass physical and/or other types of locations, such as a geographic location, an application (e.g., native application, mobile application, web application, a specific version of an application, etc.), a website, and/or a web page.

Candidate-job features 222 may include metrics and/or attributes related to a candidate's compatibility and/or interaction with a listing for a job or other type of opportunity. For example, candidate-job features 222 may include a match score between the member and the opportunity, which can be calculated based on overlap or commonality between the member's attributes in profile data 216 and the corresponding attributes in jobs data 218 for the opportunity (e.g., similarity in country, seniority, industry, and/or function between the member and opportunity). In another example, candidate-job features 222 may include cross products, cosine similarities, Jaccard similarities, Euclidean distances, and/or other measures of similarity between the candidate's skills and skills listed in the job; the candidate's current title and/or past titles and the job's title; and/or the candidate's headline and/or summary (e.g., in the candidate's resume, online network profile, etc.) and the job's description.

Title preferences 224 may include titles that represent the preferred "next step" in the candidates' career paths. For example, a candidate may manually or explicitly specify one or more "preferred titles" for jobs in which the candidate is interested. In another example, a candidate's title preference may be inferred from titles that appear in the candidate's recent job searches and/or job applications, as described in further detail below. Feature-processing apparatus 204 may include representations of title preferences 224 in features for the corresponding candidates and/or calculate similarities between title preferences 224 and titles in job features 220.

After job features 220, candidate-job features 222, and/or title preferences 224 are calculated for one or more candidate-job pairs, feature-processing apparatus 204 may store job features 220, candidate-job features 222, and/or title preferences 224 in data repository 134 for subsequent retrieval and use. Feature-processing apparatus 204 may also, or instead, provide the features to a model-creation apparatus 210, a management apparatus 206, and/or another component of the system for use in creating and/or executing machine learning model 208 using the features.

Model-creation apparatus 210 trains and/or updates one or more machine learning models 208 using sets of features from feature-processing apparatus 204, outcomes 212 associated with the feature sets, and predictions 214 produced from the feature sets. In general, model-creation apparatus 210 may produce machine learning models 208 that generate predictions and/or estimates related to the candidates' job search and/or career preferences.

First, model-creation apparatus 210 may create and/or update one or more machine learning models 208 that generate predictions representing the likelihood that a candidate applies to a job, given the candidate's impression of a listing, description, or recommendation of the job. For example, model-creation apparatus 210 may apply a logistic regression model to features for a candidate-job pair to produce a score from 0 to 1 that represents the probability that the candidate applies to a job recommendation (e.g., recommendations 244) that is displayed to the candidate.

In one or more embodiments, machine learning models 208 that predict candidate likelihoods of applying to jobs include a global version, a set of personalized versions, and a set of job-specific versions. The global version may include a single machine learning model that tracks the behavior or preferences of all candidates with respect to all jobs in data repository 134. Each personalized version of the model may be customized to the individual behavior or preferences of a corresponding candidate with respect to certain job features (e.g., a candidate's personal preference for jobs that match the candidate's skills). Each job-specific model may identify the relevance or attraction of a corresponding job to certain candidate features (e.g., a job's likelihood of attracting candidates that prefer skill matches).

The output of the global version, a personalized version for a given candidate, and/or a job-specific version for a given job may be combined to generate a score representing the predicted probability of the candidate applying to the job, clicking on the job, and/or otherwise responding positively to an impression or recommendation for the job. For example, scores generated by the global version, personalized version, and job-specific version may be aggregated into a sum and/or weighted sum that is used as the candidate's predicted probability of responding positively to the job after viewing the job.

Features inputted into the global, personalized, and/or job-specific versions of machine learning model may include, but are not limited to, the candidate's title, skills, education, seniority, industry, location, and/or other professional and/or demographic attributes. The features may also include job features 220 such as the job's title, industry, seniority, desired skill and experience, salary range, and/or location. The features may further include candidate-job features 222 such as cross products, cosine similarities, statistics, and/or other combinations, aggregations, scaling, and/or transformations of the candidate's and/or job's attributes. For example, the features may include cosine similarities between standardized versions of all of the candidate's skills and all of the job's skills. Candidate-job features 222 may also, or instead, include measures of similarity and/or compatibility between one attribute of the candidate and another attribute of the job (e.g., a match percentage between a candidate's "Java" skill and a job's "C++" skill).

Features inputted into the global, personalized, and/or job-specific versions of the machine learning model may further include explicit and/or inferred title preferences 224 of the candidate and/or measures of similarity between each of the candidate's title preferences 224 and the corresponding job's title. For example, the candidate's title preferences 224 may be converted into one or more standardized titles that are used to populate a title preferences vector for the candidate. Each element of the vector may represent a different standardized title, with the index into the element representing an identifier for the corresponding standardized title. As a result, the element may be set to 1 if one or more title preferences 224 are converted into the corresponding standardized title and 0 otherwise. The title of a job may similarly be converted into one or more standardized titles that are used to populate a job title vector for the job. A measure of similarity between title preferences 224 and the job's title may then be calculated as a cosine similarity between the title preferences vector and the job title vector, and the cosine similarity may be included in features inputted into the machine learning model.

Second, model-creation apparatus 210 may create another machine learning model that generates a prediction representing an inferred title preference for the candidate. For example, model-creation apparatus 210 may apply a logistic regression model to a standardized title and features for a candidate that lacks explicit title preferences 224 (e.g., a candidate that has not specified any title preferences 224 in his/her job search and/or job recommendation settings) to produce a score from 0 to 1 that represents the probability that the candidate selects the standardized title as a title preference.

Features inputted into the machine learning model may include, but are not limited to, titles in the candidate's job searches, job applications, dismissals of jobs, and/or other types of recent job-related activity from the candidate. For example, feature-processing apparatus 204 may calculate counts of the candidate's job searches, job applications, dismissals of job recommendations, and/or other types of job-related activity from records of the candidate's recent (e.g., in the last month, in the last six months, etc.) job-related activity in data repository 134. Feature-processing apparatus 204 may also identify the longest "sequence" of actions involving the same standardized title (e.g., a "Product Manager" title in three consecutive job applications and/or job views) and/or one or more standardized titles in consecutive sequences of actions of a certain length (e.g., a "Product Manager" title in at least three consecutive job applications and/or job views).

Feature-processing apparatus 204 may then calculate cosine similarities, Jaccard similarities, and/or other measures of similarity between a potential title preference and titles found in the candidate's job-related activity (e.g., job applications, job searches, job views, sequences of actions involving the same title, etc.). Feature-processing apparatus 204 may also, or instead, weight the measures of similarity by the frequency of the corresponding titles associated with a given job-related activity (e.g., job search, job application, dismissal of job recommendation, job view, etc.).

To create and/or update machine learning models 208, model-creation apparatus 210 uses predictions 214, outcomes 212 (e.g., labels), and features associated with the corresponding candidates and/or candidate-job pairs to update parameters of machine learning models 208. For example, model-creation apparatus 210 may use the following rule to update parameters of a logistic regression model:

$$\beta_i(t+1)=\beta_i(t)+\text{learning\_rate}*(y-\hat{y})*\hat{y}*(1-\hat{y})*x_i$$

In the above rule, $\beta_i(t)$ represents the $i^{th}$ coefficient of the logistic regression model, $\beta_i(t+1)$ represents the update to the coefficient, $\hat{y}$ represents predictions 214, y represents outcomes 212, and $x_i$ represents one or more features used with the coefficient. In turn, the logistic regression model may be trained to predict outcomes 212 based on the corresponding features.

Outcomes 212 related to machine learning models 208 that predict a candidate's likelihood of applying to a job may include positive responses to job impressions (e.g., applying to the job and/or saving the job) and negative responses to job impressions (e.g., skipping the job and/or dismissing the job). Such outcomes 212 may be obtained from records of user interaction with jobs in event streams 200 and/or data repository 134. The positive responses may be assigned a label of 1, and the negative responses may be assigned a label of 0.

Outcomes 212 related to machine learning models 208 that predict inferred title preferences for candidates may include positive outcomes 212 containing known title preferences, which are obtained from recently provided title preferences (e.g., title preferences that have been explicitly set and/or updated in the last six months) in data repository 134. Outcomes 212 may also include negative outcomes 212 containing unlikely title preferences, which are randomly generated from titles that are not the candidates' explicit title preferences and/or titles that are not found in trends and/or patterns associated with the candidates' career paths and/or job histories. Positive outcomes 212 may be assigned a label of 1, and negative outcomes 212 may be assigned a label of 0.

After machine learning models 208 are trained and/or updated, model-creation apparatus 210 stores parameters of machine learning models 208 in a model repository 236. For example, model-creation apparatus 210 may replace old values of the parameters in model repository 236 with the updated parameters, or model-creation apparatus 208 may store the updated parameters separately from the old values (e.g., by storing each set of parameters with a different version number of the corresponding machine learning model).

Finally, management apparatus 206 uses the latest versions of machine learning models 208 to generate recommendations 244 of jobs and/or inferred title preferences 224 for one or more sets of candidates. First, management apparatus 206 may retrieve the latest parameters of machine learning models 208 from model repository 236 and/or the latest features for the candidates and/or jobs from feature-processing apparatus 204. Next, management apparatus 206 may use the updated parameters and features to generate a set of scores 240 representing the candidates' likelihoods of applying to the jobs and/or the candidates' inferred title preferences 224. As with the generation of features inputted into machine learning models 208, scores 240 may be produced in an offline, batch-processing, and/or periodic basis (e.g., from batches of features), or scores 240 may be generated in an online, nearline, and/or on-demand basis (e.g., when a candidate logs in to the community, views a job, performs a job search, applies for a job, and/or performs another action).

Management apparatus 206 may then generate rankings 242 of the jobs and/or title preferences 224 by the corresponding scores 240. For example, management apparatus 206 may rank jobs for a candidate by descending predicted likelihood of applying to the jobs. In another example, management apparatus 206 may rank inferred title preferences 224 for a candidate by descending predicted likelihood of being the candidate's actual title preferences.

Finally, management apparatus 206 outputs some or all jobs and/or title preferences 224 in rankings 242 as recommendations 244 to the corresponding candidates. For example, management apparatus 206 may display some or all jobs that are ranked by a candidate's descending likelihood of applying to the jobs within a job search tool and/or within an email, notification, message, and/or another communication containing job recommendations 244 to the candidate. Subsequent responses to recommendations 244 may, in turn, be used to generate events that are fed back into the system and used to update features, machine learning models 208, and/or recommendations 244, as discussed above.

In another example, management apparatus 206 may select one or more title preferences 224 with scores 240 that exceed a threshold as inferred title preferences 224 for the corresponding candidates. Management apparatus 206 may store the inferred title preferences 224 in data repository 134 for subsequent inclusion in features generated by feature-processing apparatus 204 (e.g., features that are used to generate job recommendations for the corresponding candidates). Management apparatus 206 may also, or instead, output the inferred title preferences 224 as recommended title preferences to the candidates. The candidates may respond to the recommended title preferences by explicitly accepting or rejecting the title preferences. In turn, the candidates' responses to the recommended title preferences may be used to update subsequent features, machine learning models 208, and/or recommendations 244.

Because candidates' title preferences are included as signals that are used to generate and/or rank job recommendations, the system of FIG. 2 may provide a "soft filter" that boosts jobs with titles that match and/or are similar to candidates' title preferences 224 in job recommendations 244 for the candidates. When title preferences 224 are not explicitly provided by the candidates, the system may infer title preferences 224 based on recent job-related activity by the candidates. Responses of the candidates to the job recommendations 244 and/or inferred title preferences 224 may further be fed back to machine learning models 208 and used to increase the relevance of subsequent recommendations and/or title preferences 224 for the candidates.

In contrast, conventional techniques may require explicit title preferences from the candidates and/or apply hard filters that generate job recommendations based on exact matches with the title preferences, thereby limiting the recommendations to candidates that manually set title preferences and/or a small or narrow set of jobs. Consequently, the disclosed embodiments may improve computer systems, applications, user experiences, tools, and/or technologies related to user recommendations, employment, recruiting, and/or hiring.

Those skilled in the art will appreciate that the system of FIG. 2 may be implemented in a variety of ways. First, feature-processing apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Feature-processing apparatus 204, model-creation apparatus 210, and management apparatus 206 may additionally be implemented together and/or separately by one or more hardware and/or software components and/or layers.

Second, a number of machine learning models 208 and/or techniques may be used to generate predictions 214, scores 240, and/or rankings 242. For example, the functionality of each machine learning model may be provided by a regression model, artificial neural network, support vector machine, decision tree, naïve Bayes classifier, Bayesian network, clustering technique, collaborative filtering technique, hierarchical model, and/or ensemble model. The retraining or execution of each machine learning model may also be performed on an offline, online, and/or on-demand basis to accommodate requirements or limitations associated with the processing, performance, or scalability of the system and/or the availability of features and outcomes 212 used to train the machine learning model. Multiple versions of a machine learning model may further be adapted to different subsets of candidates (e.g., different member segments in the community), jobs, and/or title preferences 224, or the same machine learning model may be used to generate scores 240 for all candidates, jobs, and/or title preferences 224.

Third, the system of FIG. 2 may be adapted to different types of features, responses, and/or predictions. For example, a combination of global and personalized models may be used to predict user responses to advertisements, products, services, events, activities, classes, games, movies, music, articles, connection recommendations, and/or other items.

Figure 3:
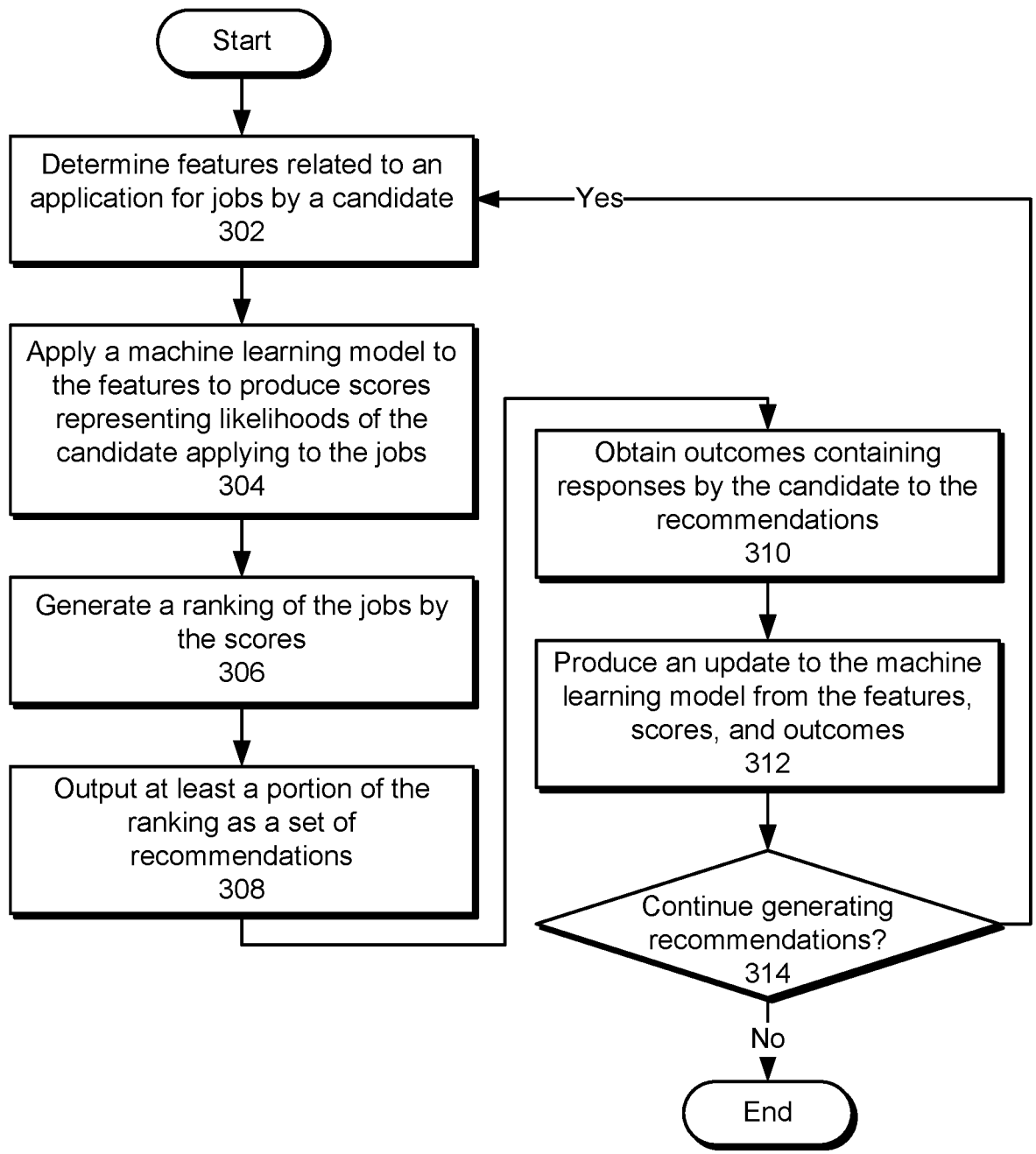
FIG. 3 shows a flowchart illustrating a process of ranking job recommendations based on title preferences in accordance with the disclosed embodiments.

FIG. 3 shows a flowchart illustrating a process of ranking job recommendations based on title preferences in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, features related to an application for jobs by a candidate are determined (operation 302). The features may include a title preference for the candidate and/or a similarity between a first set of attribute values for the candidate and a second set of attribute values for a job. The first and second sets of attribute values may include the candidate's title preference and the job's title, skills held by the candidate and required or desired for the job, seniorities of the candidate and job, industries of the candidate and job, the candidate's summary and/or headline, and/or the job's description. The similarity may be generated by populating a first vector with the first set of attribute values, populating a second vector with the second set of attribute values, and calculating a cosine similarity based on the first and second vectors. The first and second vectors may be produced by mapping elements of the first and second vectors to standardized attribute values and assigning values to the elements of the first and second vectors based on inclusion of the standardized attribute values in the corresponding first and second sets of attribute values.

Next, a machine learning model is applied to the features to produce scores representing likelihoods of the candidate applying to the jobs (operation 304). For example, a global version of the machine learning model may be applied to the features to generate a first set of scores representing the likelihoods of the candidate applying to the jobs. A personalized version of the machine learning model may also be applied to the features to generate a second set of scores representing the likelihoods of the candidate applying to the jobs. A job-specific versions of the machine learning model may further be applied to the features to generate a third set of scores representing the likelihoods of the candidate applying to the jobs. The first, second, and/or third sets of scores may then be combined into overall scores ranging from 0 to 1 that represent the candidate's predicted probability of applying to the corresponding jobs.

A ranking of the jobs by the scores is then generated (operation 306), and at least a portion of the ranking is outputted as a set of recommendations (operation 308). For example, the jobs may be ranked by descending score, and a subset of the highest-ranked jobs may be displayed and/or otherwise outputted as recommendations according to the ranking, so that recommendations with a higher likelihood of positive response (e.g., applications by the candidate) are outputted before recommendations with a lower likelihood of positive response.

After the recommendations are outputted, outcomes containing responses by the candidate to the recommendations are obtained (operation 310), and an update to the machine learning model is produced from the features, scores, and outcomes (operation 312). For example, the responses may include positive responses such as applies and/or saves, as well as negative responses such as ignores and/or dismisses. The positive responses may be used as positive outcomes for the recommendations, and the negative responses may be used as negative outcomes for the recommendations. The outcomes may then be used with the corresponding scores and features to train and/or update the parameters of the machine learning model, and the machine learning model may subsequently be used to generate scores for the same candidate-opportunity pairs and/or different candidate-opportunity pairs.

Recommendations may continue to be generated (operation 314) based on scores from the machine learning model. For example, recommendations may continue to be made to improve the user experience associated with applying to the opportunities. To continue generating recommendations, features related to applications for jobs by candidates are determined (operation 302), and the latest global, personalized, and/or job-specific versions of the machine learning model are applied to the features to produce scores representing the candidates' likelihood of applying to the jobs (operation 304). Recommendations are generated and outputted based on the scores (operations 306-308), and responses of the candidates to the recommendations are used to update the machine learning models (operations 310-312). Such generation of recommendations and updating of the machine learning model may continue until the machine learning model is no longer used to produce predictions and/or recommendations related to applying to jobs by the candidates.

Figure 4:
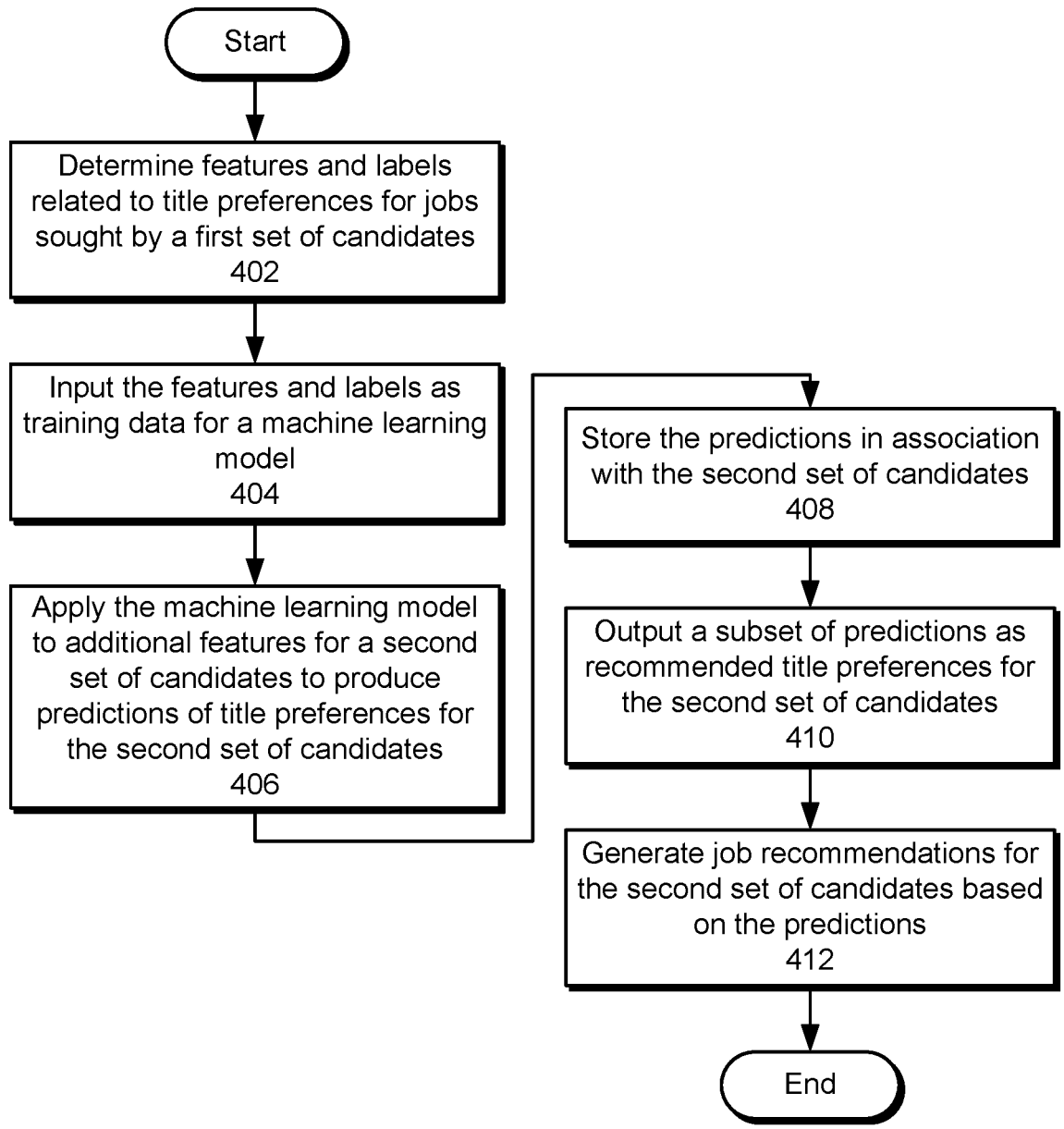
FIG. 4 shows a flowchart illustrating a process of performing activity-based inference of title preferences in accordance with the disclosed embodiments.

FIG. 4 shows a flowchart illustrating a process of performing activity-based inference of title preferences in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, features and labels related to title preferences for jobs sought by a first set of candidates are determined (operation 402). The labels may include positive labels that are generated based on recently specified title preferences associated with the first set of candidates and/or negative labels that are generated based on randomly selected title preferences that are not the recently specified title preferences of the first set of candidates. The features may include titles associated with job applications, job search queries, and/or other job-related actions of the candidates; titles associated with one or more sequences of actions by the candidates (e.g., a sequence of job searches and/or applications with the same title); and/or similarities between potential title preferences and each of the titles.

Next, the features and labels are inputted as training data for a machine learning model (operation 404). For example, the features and labels may be used to update the parameters of a logistic regression model that predicts the likelihood that a potential title preference is an actual title preference for a candidate, given a corresponding set of features for the candidate.

The machine learning model is then applied to additional features for a second set of candidates to produce predictions of title preferences for the second set of candidates (operation 406). For example, the machine learning model may output scores ranging from 0 to 1, with each score representing the probability that a potential title preference inputted into the machine learning model is an actual title preference of the candidate with the corresponding set of features.

The predictions are stored in association with the second set of candidates (operation 408). For example, potential title preferences with high likelihood of being actual title preferences (e.g., potential title preferences with scores that exceed a threshold and/or a certain number of potential title preferences with the highest scores) may be stored as inferred title preferences for the corresponding candidates.

A subset of predictions is also outputted as recommended title preferences for the second set of candidates (operation 410). For example, potential title preferences with high likelihood of being actual title preferences may be recommended to the corresponding candidates to allow the candidates to explicitly accept or reject the title preferences.

Finally, job recommendations for the second set of candidates are generated based on the predictions (operation 412). For example, inferred title preferences of the candidates may be included in features that are inputted into machine learning models and/or used to generate rankings of job recommendations for the candidates, as discussed above with respect to FIG. 3.

Figure 5:
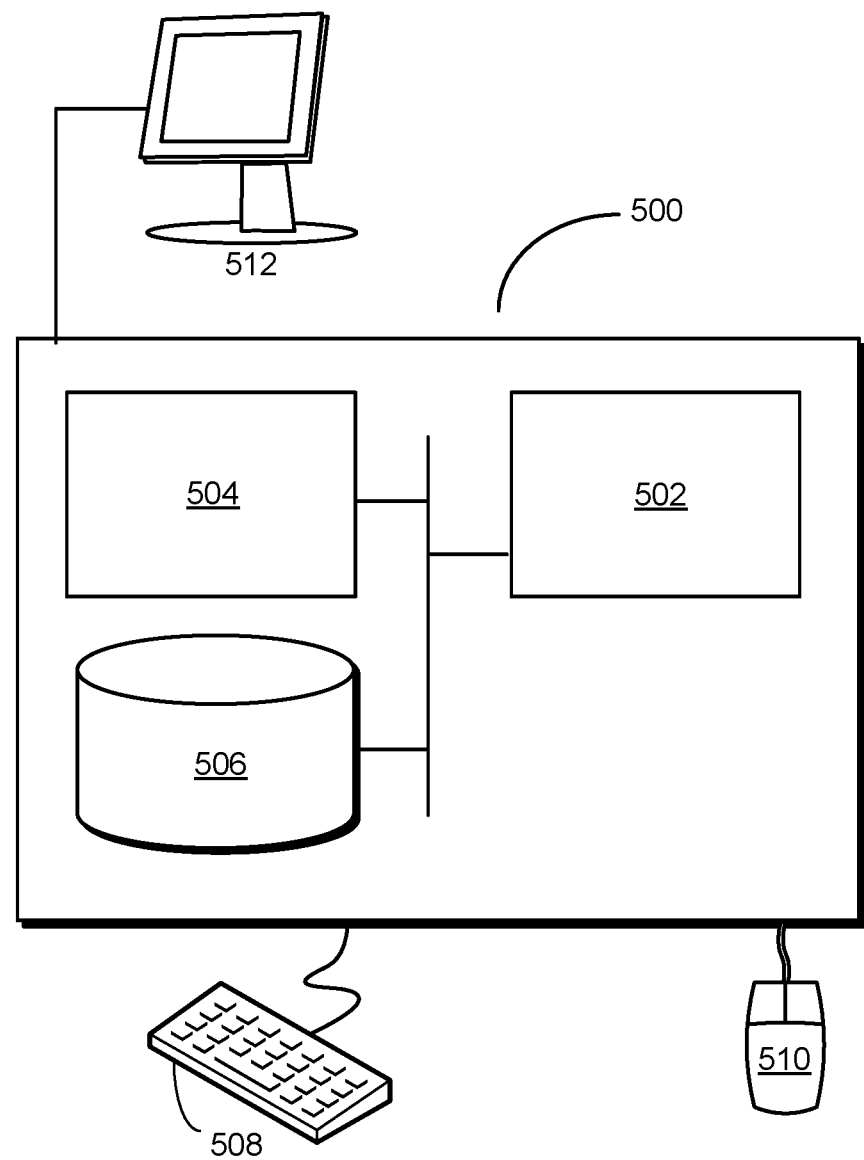
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for ranking job recommendations based on title preferences. The system includes a feature-processing apparatus, a model-creation apparatus, and a management apparatus, one or more of which may alternatively be termed or implemented as a module, mechanism, or other type of system component. The feature-processing apparatus determines features related to applications for jobs by a candidate, including a title preference for the candidate and a similarity between a first set of attribute values for the candidate and a second set of attribute values for a job. Next, the model-creation apparatus applies a machine learning model to the features to produce scores representing likelihoods of the candidate applying to the jobs. The management apparatus then generates a ranking of the jobs by the scores and outputs, to the candidate, at least a portion of the ranking as a set of recommendations.

The system may also, or instead, perform activity-based inference of title preferences. The feature-processing apparatus determines features and labels related to title preferences for jobs sought by a first set of candidates. Next, the model-creation apparatus inputs the features and the labels as training data for a machine learning model. The management apparatus then applies the machine learning model to additional features for a second set of candidates to produce predictions of the title preferences for the second set of candidates and stores the predictions in association with the second set of candidates.

In addition, one or more components of computer system 500 may be remotely located and connected to the other components over a network. Portions of the present embodiments (e.g., feature-processing apparatus, model-creation apparatus, management apparatus, data repository, model repository, online network, etc.) may also be located on different nodes of a distributed system that implements the embodiments. For example, the present embodiments may be implemented using a cloud computing system that generates job recommendations and/or inferred title preferences for a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   determining, by one or more computer systems, features and labels for use in training a machine learning model, the features including a set of positively labeled features comprising at least i) job titles explicitly specified as preferred job titles by candidates in a first set of candidates, ii) job titles of job postings associated with job applications submitted by candidates in the first set of candidates, and iii) job titles of job postings selected for viewing by candidates in the first set of candidates, and the features including a set of negatively labeled features comprising at least randomly selected job titles;
   inputting, by the one or more computer systems, the set of positively labeled features and the set of negatively labeled features as training data for training the machine learning model to predict for each candidate in a second set of candidates a preferred job title;
   subsequent to training the machine learning model, applying, by the one or more computer systems, the trained machine learning model to features for the second set of candidates to produce predictions of preferred job titles for each candidate in the second set of candidates;
   storing the predictions of preferred job titles in association with the second set of candidates;
   generating job recommendations for each candidate in the second set of candidates, by:
      inputting the predictions of preferred job titles with the features for the second set of candidates into a second, pre-trained machine learning model;
      receiving, as output from the second, pre-trained machine learning model, scores representing likelihoods of the second set of candidates applying to jobs associated with job postings; and
      generating the job recommendations for the second set of candidates based on rankings of the scores;
   detecting an interaction, by each candidate, with the job recommendation; and
   using data representing the detected interaction as additional training data to update the machine learning model to make improved predictions.

2. The method of claim 1, further comprising:
   outputting a subset of the predictions of job titles as recommended job title preferences for the second set of candidates.

3. The method of claim 1, wherein the features for the second set of candidates comprise a job title associated with an application to a job by a candidate.

4. The method of claim 1, wherein the features for the second set of candidates comprise a job title inputted into a job search query by a candidate.

5. The method of claim 1, wherein the features for the second set of candidates comprise a similarity between a potential job title preference and a job title of a job posting associated with a previous interaction by a candidate.

6. The method of claim 1, wherein the features for the second set of candidates comprise a job title associated with a sequence of actions by a candidate.

7. The method of claim 1, wherein the machine learning model comprises a logistic regression model.

8. A system, comprising:
   one or more processors; and
   memory storing instructions that, when executed by the one or more processors, cause the system to:
      determine features and labels for use in training a machine learning model, the features including a set of positively labeled features comprising at least i) job titles of job postings associated with job applications submitted by a first set of candidates, ii) job titles of job postings selected for viewing by a candidate in the first set of candidates, and iii) job titles explicitly specified as preferred job titles by candidates in a first set of candidates, and the features including a set of negatively labeled features comprising at least randomly selected job titles;
      input the set of positively labeled features and the set of negatively labeled features as training data for training the machine learning model to predict for each candidate in a second set of candidates a preferred job title;
      subsequent to training the machine learning model, apply the trained machine learning model to features for the second set of candidates to produce predictions of preferred job titles for the second set of candidates;

store the predictions of preferred job titles in association with the second set of candidates; and generate job recommendations for each candidate in the second set of candidates based on the predictions of preferred job titles, by:

inputting the predictions of preferred job titles with the features for the second set of candidates into a second, pre-trained machine learning model;

receiving, as output from the second, pre-trained machine learning model, scores representing likelihoods of the second set of candidates applying to jobs associated with job postings; and generating the job recommendations for the second set of candidates based on rankings of the score;

detect an interaction, by each candidate, with the job recommendation; and use data representing the detected interaction as additional training data to update the machine learning model to make improved predictions.

9. The system of claim 8, wherein the memory further stores instructions that, when executed by the one or more processors, cause the system to:

output a subset of the predictions of preferred job titles as recommended job title preferences for the second set of candidates.

10. The system of claim 8, wherein the features for the second set of candidates comprise a similarity between a potential job title preference and a job title of a job posting associated with a previous interaction by a candidate.

11. A non-transitory computer-readable storage medium storing instructions that when executed by a computer cause the computer to perform a method, the method comprising:

determining, by one or more computer systems, features and labels for use in training a machine learning model, the features including a set of positively labeled features comprising at least i) job titles of job postings associated with job applications submitted by candidates in the first set of candidates, ii) job titles of job postings selected for viewing by candidates in the first set of candidates, and iii) job titles explicitly specified as preferred job titles by candidates in a first set of candidates, and the features including a set of negatively labeled features comprising at least randomly selected job titles;

inputting, by the one or more computer systems, the set of positively labeled features and the set of negatively labeled features as training data for training the machine learning model to predict for each candidate in a second set of candidates a preferred job title;

subsequent to training the machine learning model, applying, by the one or more computer systems, the trained machine learning model to features for the second set of candidates to produce predictions of preferred job titles for each candidate in the second set of candidates;

storing the predictions of preferred job titles in association with the second set of candidates;

generating job recommendations fora each candidate in the second set of candidates, by:

inputting the predictions of preferred job titles with the features for the second set of candidates into a second, pre-trained machine learning model;

receiving, as output from the second, pre-trained machine learning model, scores representing likelihoods of the second set of candidates applying to jobs associated with job postings; and generating the job recommendations for the second set of candidates based on rankings of the scores;

detecting an interaction, by each candidate, with the job recommendation; and using data representing the detected interaction as additional training data to update the machine learning model to make improved predictions of preferred job titles.

\* \* \* \* \*

UNITED STATES PATENT AND TRADEMARK OFFICE
CERTIFICATE OF CORRECTION

| | |
|---|---|
| PATENT NO. | : 11,443,255 B2 |
| APPLICATION NO. | : 16/185365 |
| DATED | : September 13, 2022 |
| INVENTOR(S) | : Yuan et al. |

It is certified that error appears in the above-identified patent and that said Letters Patent is hereby corrected as shown below:

In the Claims

In Column 17, Line 14, in Claim 8, delete "score;" and insert --scores;-- therefor In Column 18, Line 20, in Claim 11, delete "fora" and insert --for-- therefor Signed and Sealed this
Fifteenth Day of November, 2022

Katherine Kelly Vidal
*Director of the United States Patent and Trademark Office*